(12) United States Patent
Imamura et al.

(10) Patent No.: US 8,061,048 B2
(45) Date of Patent: *Nov. 22, 2011

(54) APPARATUS FOR AZIMUTH MEASUREMENTS USING GYRO SENSORS

(75) Inventors: Tsunehiko Imamura, Nagano (JP); Akira Kamiya, Kanagawa-Ken (JP); Shigeru Sato, Tokyo (JP); Juei Igarashi, Kanagawa-Ken (JP); Tsutomu Yamate, Kanagawa-Ken (JP)

(73) Assignees: Schlumberger Technology Corporation, Sugar Land, TX (US); Tamagawa Seiki Co., Ltd., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/727,236

(22) Filed: Mar. 19, 2010

(65) Prior Publication Data

US 2010/0223796 A1    Sep. 9, 2010

Related U.S. Application Data

(63) Continuation-in-part of application No. 12/240,943, filed on Sep. 29, 2008, now Pat. No. 7,712,223.

(51) Int. Cl.
*G01C 19/04* (2006.01)
(52) U.S. Cl. ................ 33/318; 33/304; 33/321
(58) Field of Classification Search .............. 33/302, 33/304, 316, 318, 321, 324
See application file for complete search history.

(56) References Cited

U.S. PATENT DOCUMENTS

| | | | | |
|---|---|---|---|---|
| 4,265,028 A * | 5/1981 | Van Steenwyk | | 33/304 |
| 4,468,863 A * | 9/1984 | Van Steenwyk | | 33/304 |
| 4,611,405 A * | 9/1986 | Van Steenwyk | | 33/304 |
| 4,706,388 A * | 11/1987 | Van Steenwyk | | 33/304 |
| 4,756,088 A * | 7/1988 | Russell et al. | | 33/312 |
| 4,987,684 A | 1/1991 | Andreas et al. | | |
| 6,895,678 B2 * | 5/2005 | Ash et al. | | 33/321 |
| 7,712,223 B2 * | 5/2010 | Imamura et al. | | 33/318 |
| 2005/0126022 A1 | 6/2005 | Hansberry et al. | | |
| 2007/0175055 A1 | 8/2007 | Estes et al. | | |
| 2009/0119937 A1 | 5/2009 | Watson | | |
| 2009/0217539 A1 | 9/2009 | Blake | | |
| 2010/0089572 A1 * | 4/2010 | Chang et al. | | 33/313 |

FOREIGN PATENT DOCUMENTS

EP    1184539    3/2002

* cited by examiner

*Primary Examiner* — Brad Bennet
(74) *Attorney, Agent, or Firm* — Daryl R. Wright; Jody DeStefanis; Jeff Griffin

(57) ABSTRACT

An apparatus for azimuth measurements is provided. The apparatus comprises a housing and a plurality of gyro sensors aligned in the housing. Each of the plurality of gyro sensors has an input axis for angular velocity measurements. There is provided a drive unit for rotating each of the plurality of gyro sensors about a rotation axis. Each of the plurality of gyro sensors changes orientation of the input axis with the drive unit.

13 Claims, 16 Drawing Sheets

APPARATUS FOR AZIMUTH MEASUREMENTS USING GYRO SENSORS

The present application claims priority under 35 U.S.C. §120 as a continuation-in-part U.S. Non-Provisional application Ser. No. 12/240,943 naming Tsunehiko Imamura et al. as inventors, and filed Sep. 29, 2008, now pending, the aforementioned application being incorporated herein by reference in its entirely for all purposes.

FIELD OF THE INVENTION

The present invention relates to apparatuses for azimuth measurements using gyro sensors in downhole. More particularly, the invention relates to apparatuses for azimuth measurements with gyro sensors in open-holes or cased-holes during oilfield operations such as wellbore drilling operations and wireline logging operations.

BACKGROUND OF THE INVENTION

In recent wellbore drilling operations, the drilling is mostly performed in highly deviated and horizontal wellbores. To drill a wellbore as planned prior to drilling, it is important to monitor an inclination of the wellbore and continually determine the position and direction of the drilling tool during drilling. For this monitoring, azimuth with respect to drilling direction and then an axis of the drilling tool is one of important information during drilling. The azimuth can be measured by utilizing some sensors such as a gyro sensor installed in the drilling tool during drilling. In wireline logging operations, a logging tool is conveyed into a wellbore after the wellbore has been drilled. The gyro sensor is used to measure azimuth with respect to the direction of the logging tool.

To improve accuracy and efficiency of the azimuth measurements, a plurality of gyro sensors with each input axis orthogonal to each other may be used. In this combination of the gyro sensors, each gyro sensor is rotated about its rotation axis perpendicular to the input axis. The drive unit for rotating the gyro sensors is configured so as to rotate the gyro sensors stably while maintaining a predetermined angular relationship between the input axes of gyro sensors. In practical point of view, the gyro sensors and the drive unit are installed in relatively narrow space in the foregoing drilling tool and wireline logging tool. Therefore, there is a need for a compact apparatus for azimuth measurements using gyro sensors that can allow the gyro sensors to be stably rotated in cooperation with each other even if such gyro sensors are used, for example, in oilfield and any other harsh environment.

BRIEF SUMMARY OF THE INVENTION

In consequence of the background discussed above, and other factors that are known in the field of oil exploration and development, apparatuses for azimuth measurements are provided. In one embodiment of the present invention, an apparatus for azimuth measurements comprises a housing, a plurality of gyro sensors aligned in the housing, each of the gyro sensors having an input axis for angular velocity measurements, a drive unit for rotating each of the plurality of gyro sensors about a rotation axis, each of the plurality of gyro sensors changes orientation of the input axis with the drive unit. In one embodiment of the present invention, each of the plurality of gyro sensors comprises a vibrating structure oscillated by an electromagnetic force in a first magnetic field. In one embodiment of the present invention, the vibrating structure is shielded from an external second magnetic field.

BRIEF DESCRIPTION OF THE DRAWINGS

The accompanying drawings illustrate preferred embodiments of the present invention and are a part of the specification. Together with the following description, the drawings demonstrate and explain principles of the present invention.

DETAILED DESCRIPTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having benefit of the disclosure herein.

Figure 1:
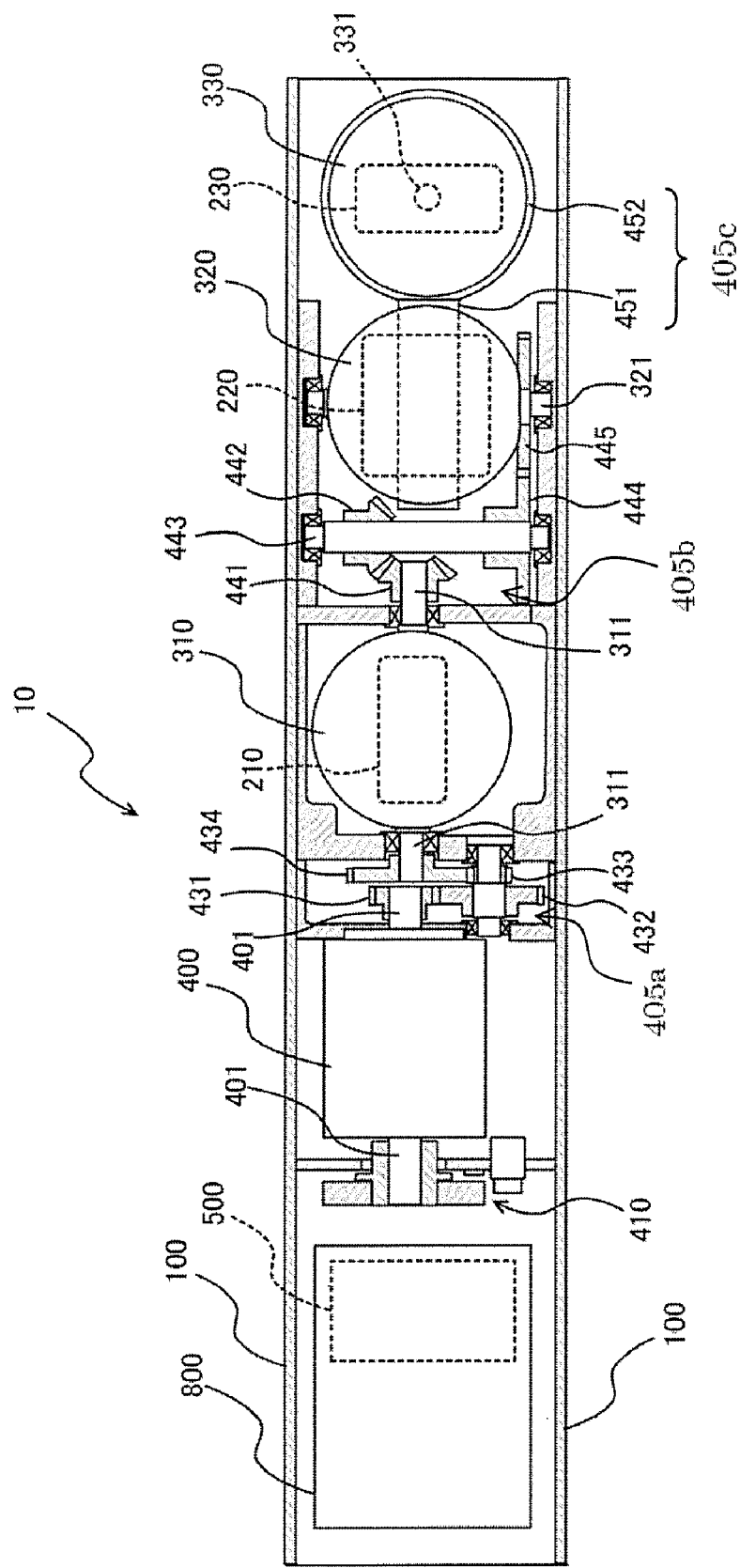
FIG. 1 shows a partial cross-sectional plan view of a sensor apparatus for azimuth measurements in an embodiment according to the present invention.

FIG. 1 shows a partial cross-sectional plan view of a sensor apparatus for azimuth measurements in accordance with one embodiment of the present invention. The sensor apparatus 10 comprises a housing 100. In the housing 100, three gyro sensors 210, 220, 230 are placed. The housing 100 is elongated as illustrated. More specifically, the housing 100 is mostly cylindrical in shape and may be made from heat conductive metal such as stainless steel. As the results, the housing 100 can be easily located in a longitudinal direction of a logging tool. Moreover, gyro sensors 210, 220, 230 can be aligned along the longitudinal direction of the elongated housing 100. As a part of each gyro sensor, sensor holders 310, 320, 330 are provided to cover those gyro sensors 210, 220, 230, respectively. The sensor apparatus 10 comprises a drive unit for rotating each of the gyro sensors 210, 220, 230 about a rotation axis. The drive unit includes a motor 400 as a source of power. Various types of motors such as a synchronous motor (for example, a stepper motor) or an induction motor can be used as the motor 400. The motor 400 is connected to the gyro sensors 210, 220, 230 through a transmission mechanism 405a, 405b, 405c as mentioned below. The motor 400 is also connected to a controller 500 which is generally configured to be a part of an electrical system 800 including peripheral circuits. Other elements of the sensor apparatus 10 are arranged in the housing 100.

Figure 2:
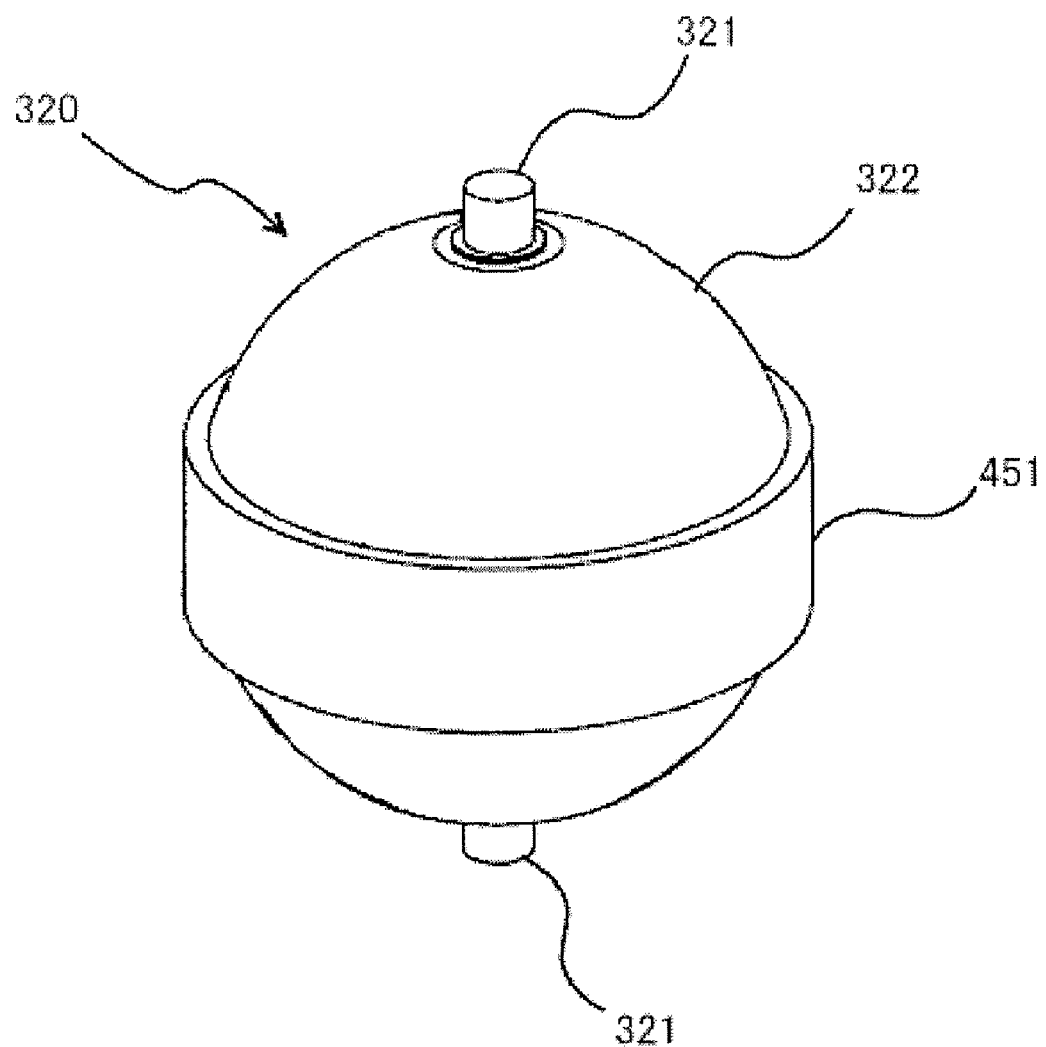
FIG. 2 shows a perspective view of an example of the sensor holder.

FIG. 2 shows a perspective view of an example of the sensor holders. Each body 312, 322, 332 of the sensor holders 310, 320, 330 is mostly spherical in shape and includes a corresponding gyro sensor inside. An input axis for angular velocity measurements is defined in each of the gyro sensors 210, 220, 230. Each of the sensor holders 310, 320, 330 is rotatable about a rotation axis so as to change the orientation of the input axis of the gyro sensor. Both ends of the rotation shafts of the sensor holder are supported with bearings in the housing 100. The second sensor holder 320 has a helical gear 451 attached along the great circle on an outer surface of the second sensor holder 320 as shown in FIG. 2. The third sensor holder 330 has a helical gear 452 attached along the great circle on an outer surface of the third sensor holder 330. The two helical gears 451, 452 are jointed to each other in a crossing manner at a contacting position of the sensor holders 320, 330 so that the rotation force is transferred from the second sensor holder to the third sensor holder.

Figure 3:
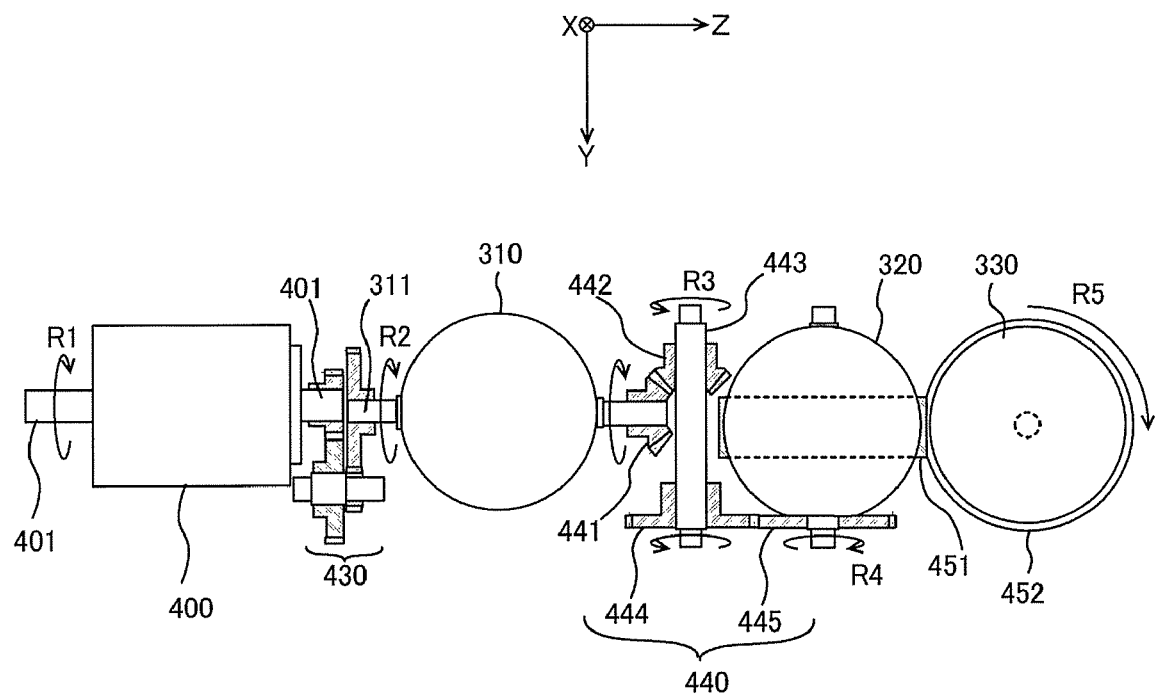
FIG. 3 shows an explanatory view of a transmission mechanism of the sensor apparatus.

FIG. 3 shows an explanatory view of the transmission mechanism of the sensor apparatus 10. The transmission mechanism comprises a reduction gear unit 430, an intermediate transmission mechanism 440 and a pair of the helical gears 451, 452. The reduction gear unit 430 includes four spur gears 431, 432, 433, 434, and transmits a rotation force from a rotation shaft 401 of the motor 400 to a rotation shaft 311 of the first sensor holder 310 with a predetermined reduction ratio (e.g. 1:5 or 1:10). The intermediate transmission mechanism 440 includes a pair of miter gears 441, 442 having conically shaped teeth faces, an idle shaft 443 and spur gears 444, 445. The idle shaft 443 has the miter gears 442 at one end and the spur gear 444 at an opposite end. The idle shaft 443 is arranged to be orthogonal to the rotation shaft 311 of the first sensor holder 310 and parallel to the rotation shaft 321 of the second sensor holder 320. The miter gear 441 is fixed at an end of the rotation shaft 311 of the first sensor holder 310 and another miter gear 442 is fixed on the end of the idle shaft 443. The conically shaped teeth faces of the miter gears 441, 442 are coupled with each other so as to transmit a rotation force of the rotation shaft 311 to the idle shaft 443 with rotation axes of the both shafts 331, 443 orthogonal to each other. The spur gear 444 is fixed at an opposite end of the idle shaft 443 and the spur gear 445 is fixed on a rotation shaft 321 of the second sensor holder 320. Rotation force of the idle shaft 443 is transmitted to the rotation shaft 321 of the second sensor holder 320 through the spur gears 444, 445.

By aforementioned combination of the motor 400 and the transmission mechanism, the gyro sensors 210, 220, 230 together with the sensor holders 310, 320, 330 can be stably rotated in cooperation with each other as shown in FIG. 3. When the motor 400 rotates in a rotation direction indicated by the arrow R1, the sensor holder 310 with the first gyro sensor 210 rotates in a rotation direction indicated by the arrow R2 at an angular rate reduced by the reduction gear unit 430. Accordingly, the input axis of the first gyro sensor 210 can be aligned to an arbitrary orientation parallel to an XY plane with respect to an orthogonal coordinates defined in FIG. 3. When the sensor holder 310 rotates, the rotation force is transmitted the rotation shaft 311 to the rotation shaft 321 through the intermediate transmission mechanism 440 with the idle shaft 443 rotating in a rotation direction indicated by the arrow R3. Then, the sensor holder 320 with the second gyro sensor 220 rotates in a rotation direction indicated by the arrow R4. Accordingly, the input axis of the second gyro sensor 220 can be aligned to an arbitrary orientation parallel to a ZX plane. When the sensor holder 320 rotates, the rotation force is transmitted to the sensor holder 330 by the pair of helical gears 451, 452 and the sensor holder 330 with the third gyro sensor 230 rotates in a rotation direction indicated by the arrow R5. Accordingly, the input axis of the third gyro sensor 230 can be aligned to an arbitrary orientation parallel to a YZ plane.

For azimuth measurements, two or three orthogonal accelerometers may be preferably provided in the sensor apparatus 10. The accelerometers are used to determine a horizontal plane on which an earth rate vector determined by the gyro sensors. The accelerometers may be either conventional Q-flex types or MEMS type accelerometers.

A rotation angle sensor 410 may be preferably provided in order to detect a rotation angle position of a rotation shaft 401 of the motor 400 or an output shaft of the reduction gear unit 430 (i.e. the rotation shaft 311 of the first sensor holder 310). Various types of rotation angle sensors such as a mechanical or optical encoder can be used as the rotation angle sensor 410. By using the detected rotation angle position, the angular orientation of each input axis of the gyro sensors 210, 220, 230 can be identified. This monitoring the angular rotation position allows the sensor apparatus 10 to return each gyro sensor at a home position and set each input axis of the gyro sensors aligned to a predetermined home angular orientation, whenever the system power is turned on. In addition, it is important to monitoring the angular rotation position during the azimuth measurement for reliability of the sensor apparatus.

Figure 4:
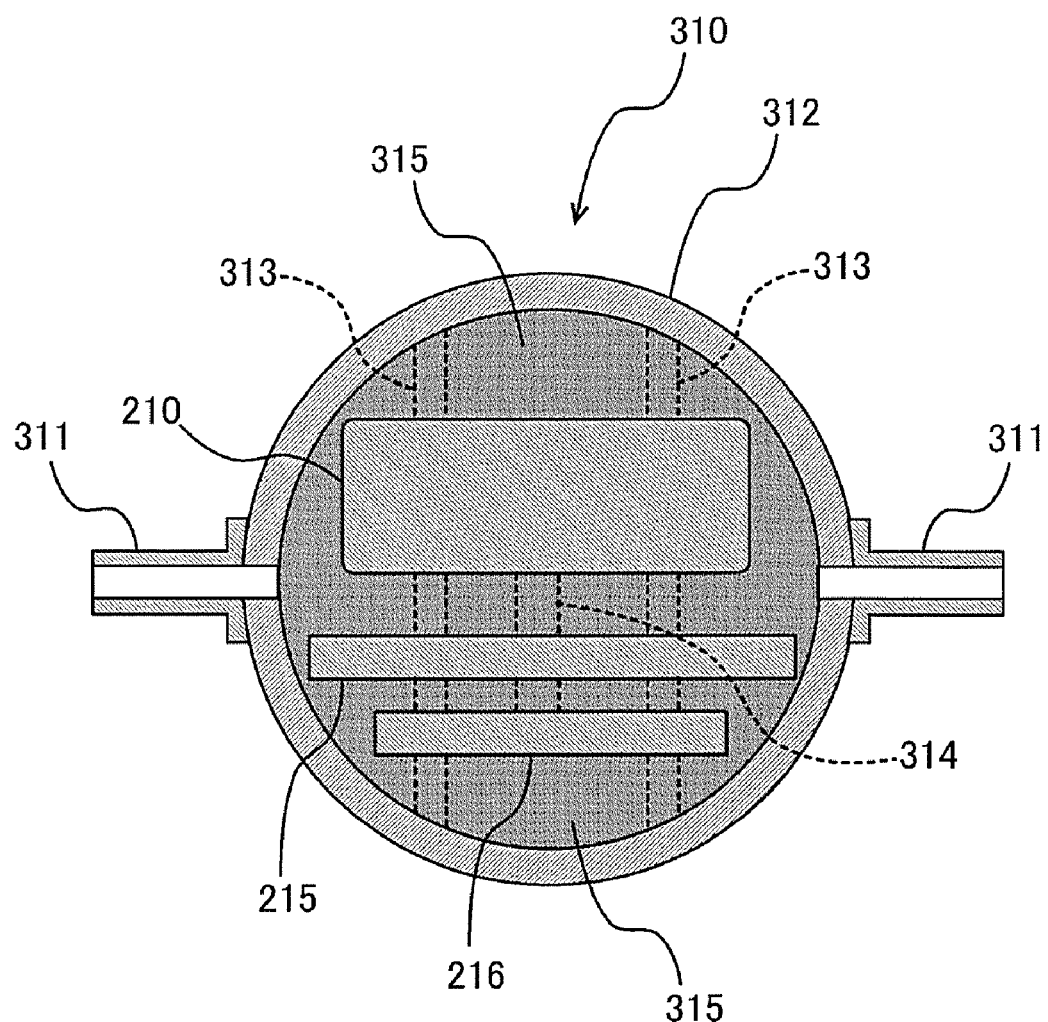
FIG. 4 shows an explanatory view of an example of internal structure of a sensor holder.

FIG. 4 shows an explanatory view of an example of internal structure of a sensor holder. Each of the sensor holders 310, 320, 330 has some hollow space inside. For example, the first sensor holder has a gyro sensor 210 and electrical circuit boards 215, 216 supported by spacers 313 inside as shown in FIG. 4. The gyro sensor 210 and electrical circuit boards 215, 216 are connected by electrical wirings 314. There are some hollow space between the gyro sensor 210, the electrical circuit boards 215, 216 and the electrical wirings 314 in the sensor holder 310. The hollow space may be filled with insulating and heat-resisting material such as silicone resin to prevent electronic components on the electrical circuit boards 215, 216 from dropping out. A heat-resisting material may be preferably used for filling the hollow space.

Figure 5A:
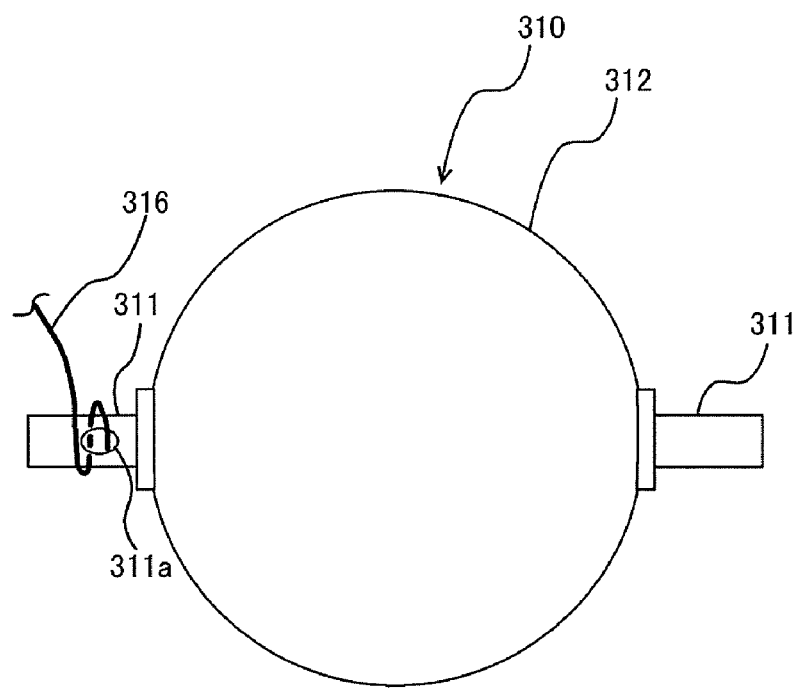
FIGS. 5A and 5B show explanatory views of an example of electrical interconnection between a gyro sensor and a data processing unit.
Figure 5B:
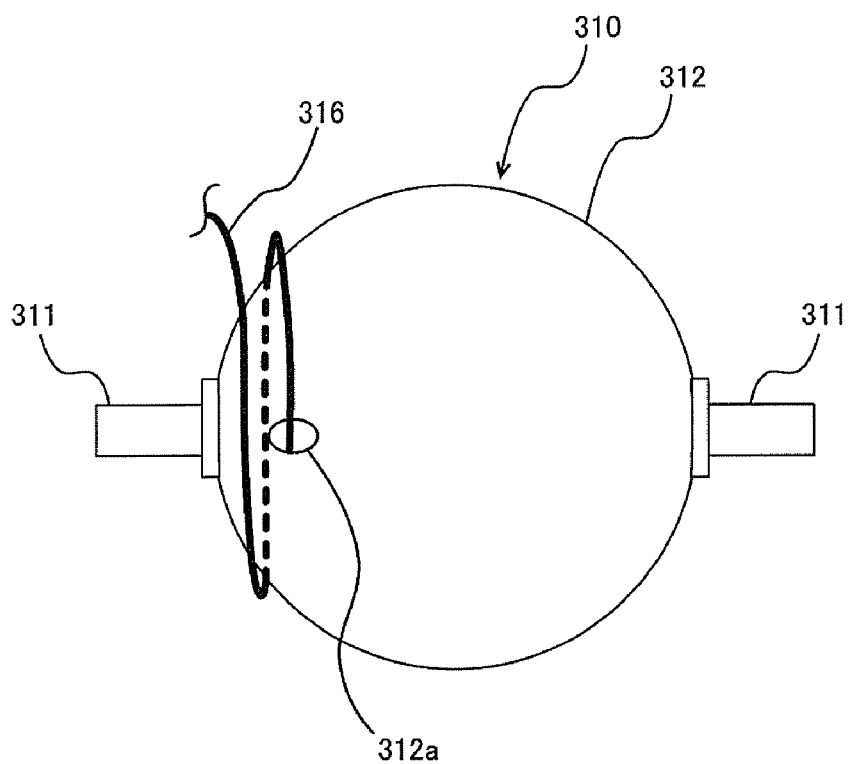

FIGS. 5A and 5B show explanatory views of examples of electrical interconnection between the gyro sensor and the data processing unit 600 in the electric system 800. An electrical wiring 316 may be led out from the electrical circuit board in the sensor holder 310 via a side through hole 311a of the rotation shaft 311 as shown in FIG. 5A. The electrical wiring 316 also may be led out via a hole 312a made on spherical surface of the sensor holder body 312 as shown in FIG. 5B. The electrical wiring 316 is wound around the outer surface of the rotation shaft 311 or the sensor holder body 312 for making a margin of wiring before rotating the sensor holder 310.

Figure 6:
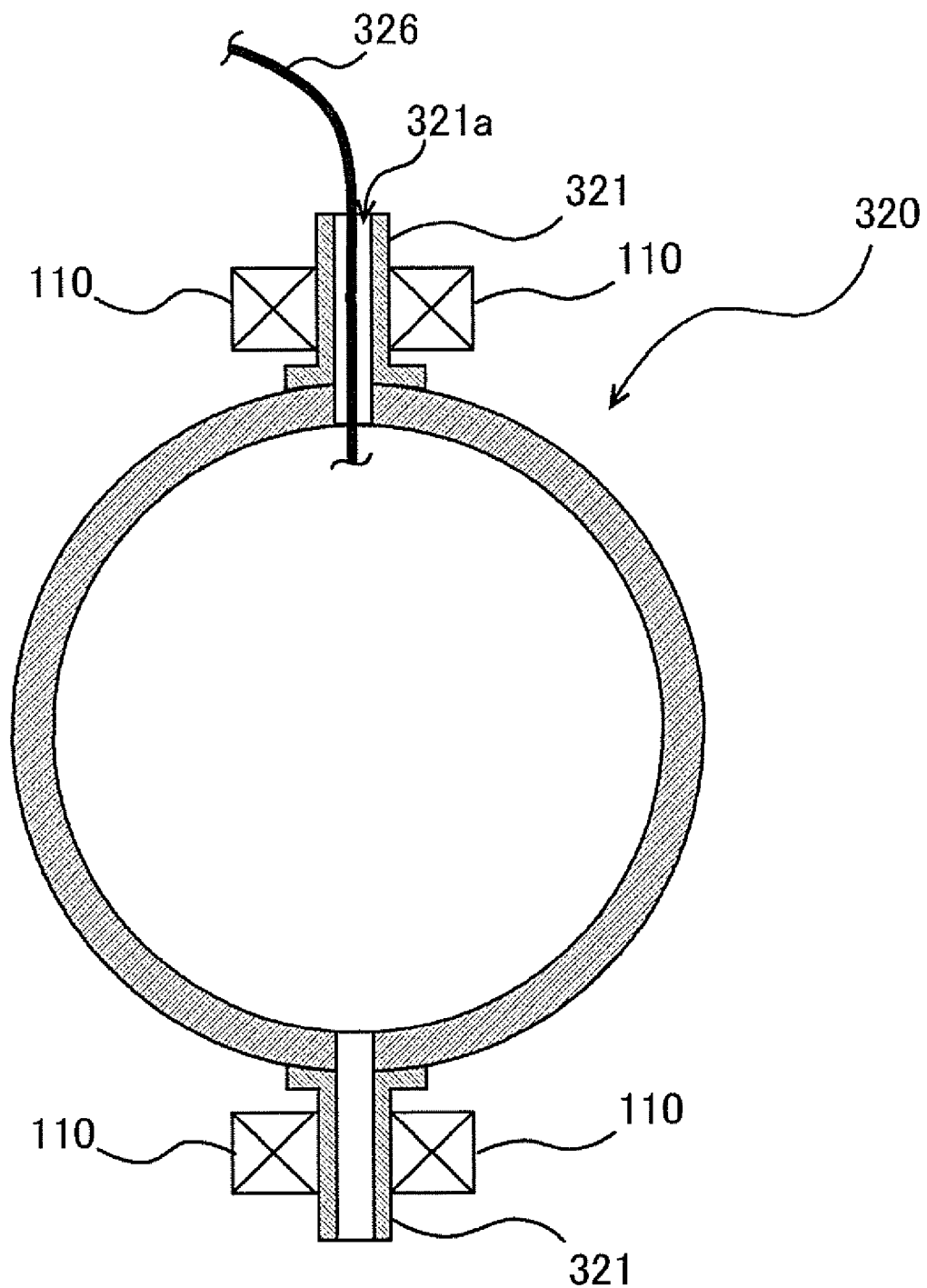
FIG. 6 shows an explanatory view of another example of electrical interconnection between a gyro sensor and a data processing unit.

FIG. 6 shows an explanatory view of another example of the electrical interconnection. This connection may be suitable for the second and third sensor holders 320, 330. An electrical wiring 326 may be led out from the electrical circuit board in the sensor holder 320 via an axial through hole 321a of the rotation shaft 321 supported with bearings 110 as shown in FIG. 6.

Figure 7A:
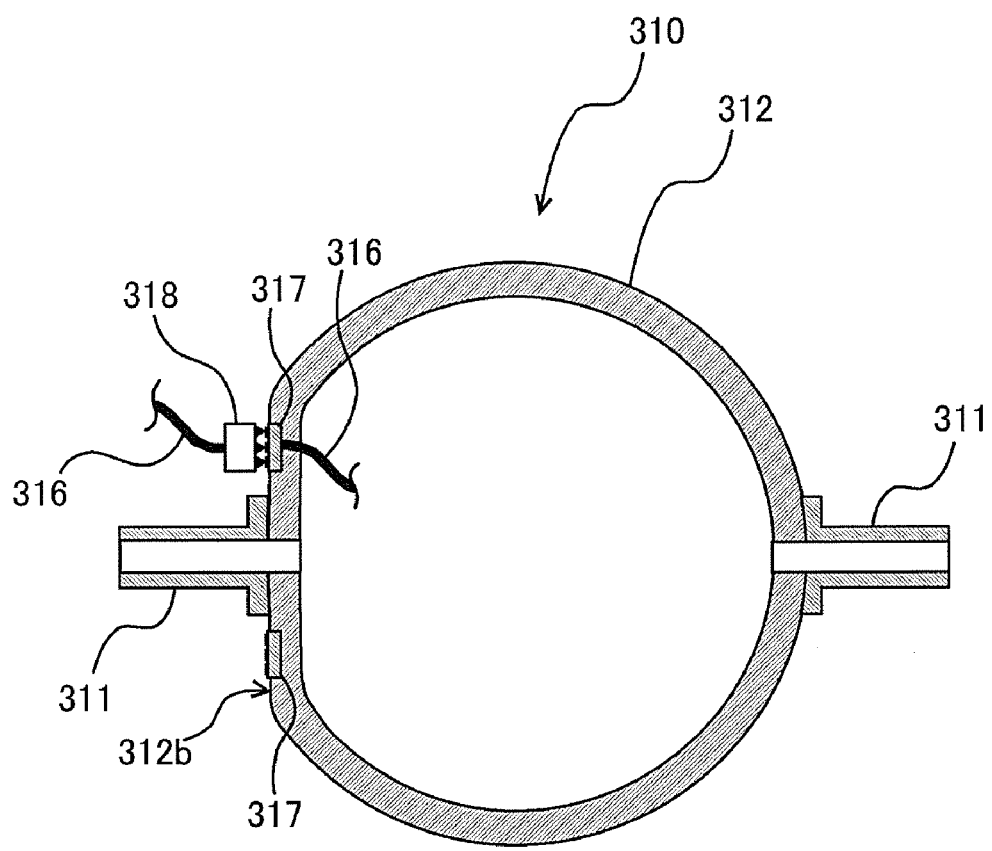
FIGS. 7A and 7B show explanatory views of yet another example of electrical interconnection between a gyro sensor and a data processing unit.
Figure 7B:
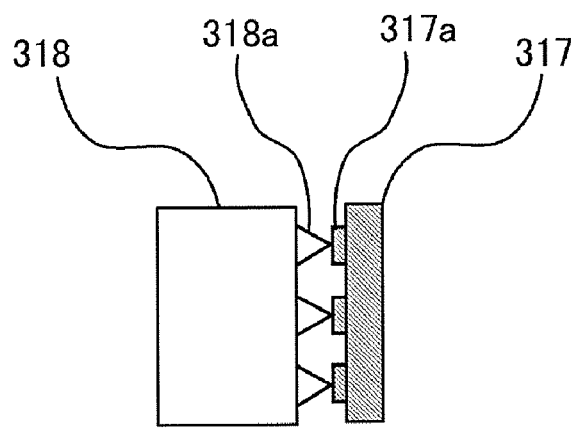

FIGS. 7A and 7B show explanatory views of yet another example of the electrical interconnection. Two electrical wirings 316 from the data processing unit 600 and the electrical circuit board in the sensor holder may be connected via a combination of a ring-shaped slip-electrode member 317 and a contact electrode member 318. The slip-electrode member 317 is attached on flat portion 312b of the outer surface of the sensor holder body 312 and has a plurality of ring-shaped slip-electrodes 317a. The contact electrode member 318 is fixed in the housing 100 and has a plurality of contact pins 318a corresponding to the slip-electrodes 317a. The corresponding slip-electrode 317a and contact pin 318a are kept contact to each other during rotating the sensor holder 310.

The electrical communication between the electrical circuit board and the data processing unit 600 may be performed by a short-distance wireless communication.

Figure 8:
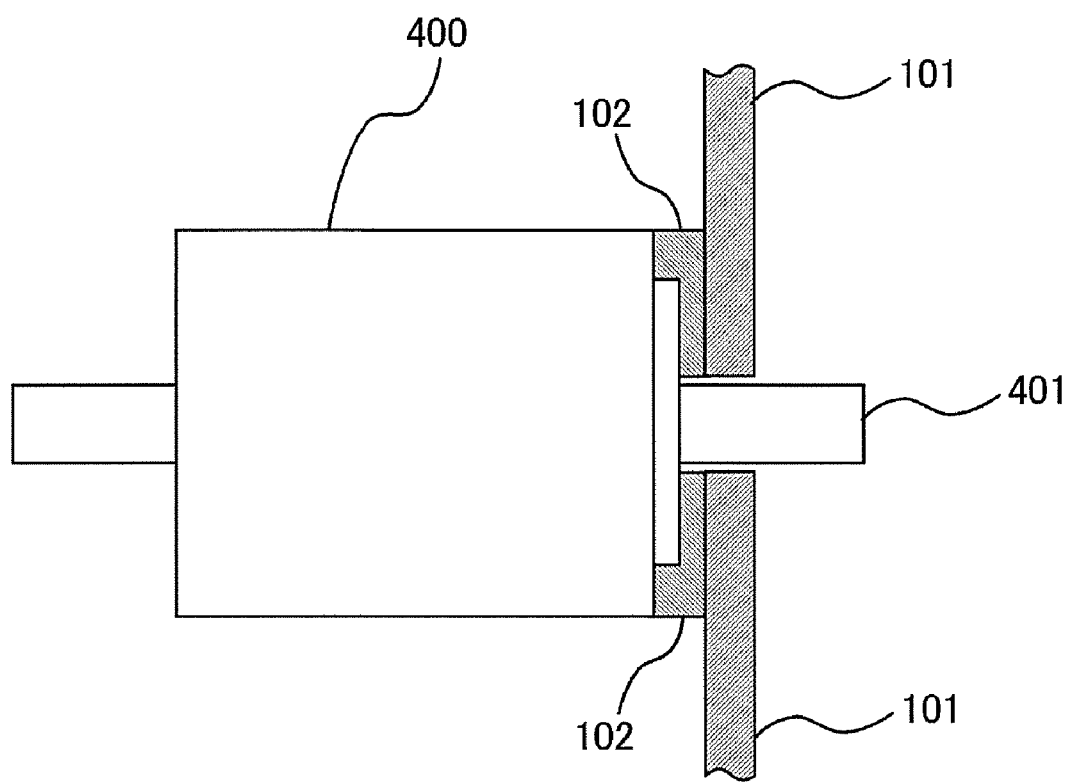
FIG. 8 shows an explanatory view of an example of a heat insulation layer between a motor and sensor holders.

FIG. 8 shows an explanatory view of an example of a heat insulation layer between the motor 400 and sensor holders. The heat insulation layer 102 may be inserted between the motor 400 and a support member 101 fixed to the housing 100 to avoid heat flow from the motor 400 to the sensor holders. A heat-resisting material such as polyimide resin may be used for the heat insulation layer.

Figure 9:
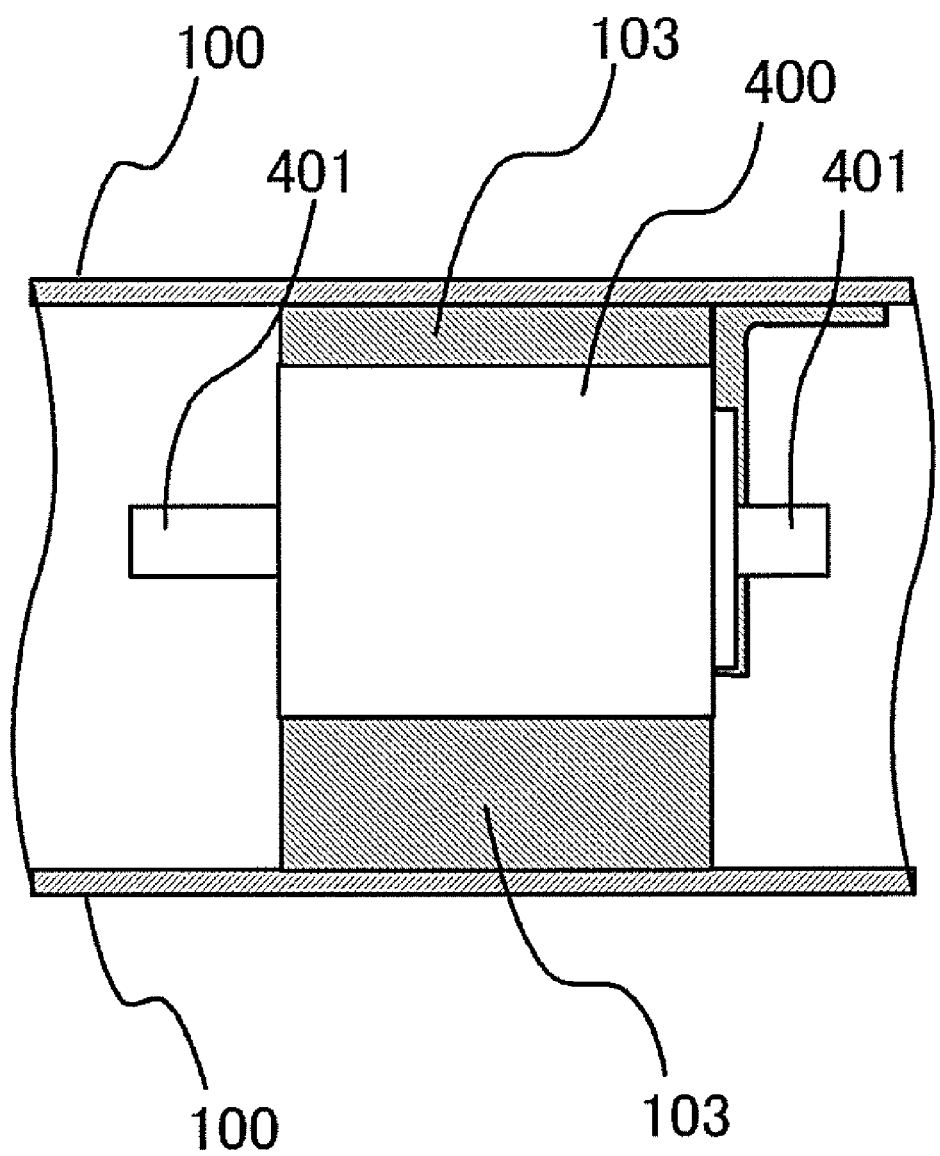
FIG. 9 shows an explanatory view of an example of a heat release layer between a motor and an internal surface of a housing.

FIG. 9 shows an explanatory view of an example of a heat release layer between a motor and an internal surface of a housing. The heat release layer 103 may be inserted into a hollow space around the motor 400. A heat conductive material such as metal or a thermally conductive high performance resin may be used for the heat release layer 103.

Figure 10:
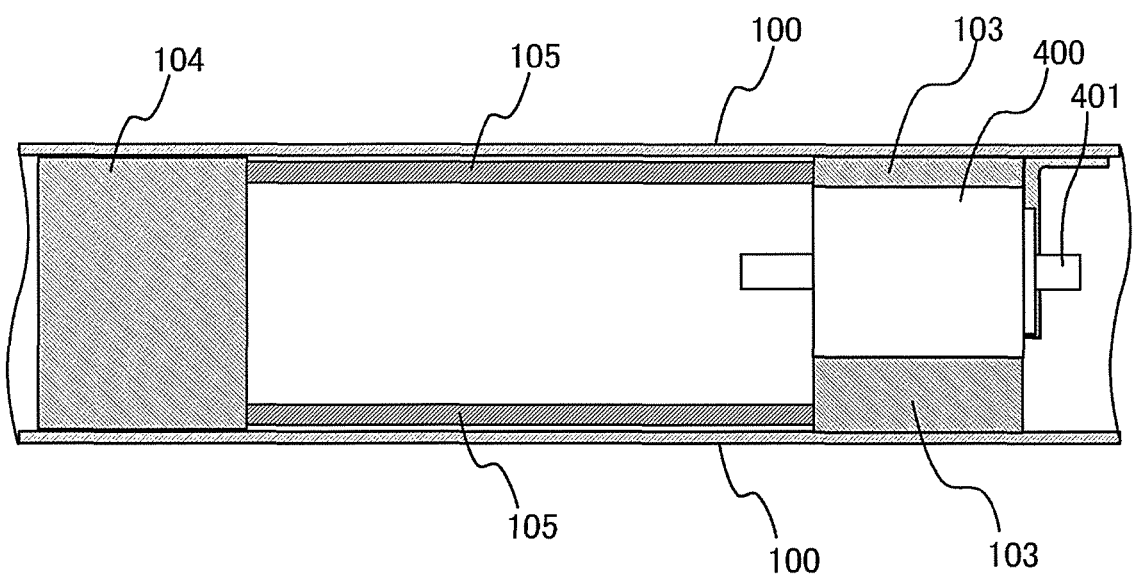
FIG. 10 shows an explanatory view of an example of a thermal mass and a heat pipe thermally connecting between the thermal mass and a motor.

FIG. 10 shows an explanatory view of an example of a thermal mass and a heat pipe thermally connecting between the thermal mass and a motor. The heat release layer 103 may be connected to a thermal mass 104 with a heat pipe 105 to release heat from the motor 400 efficiently. The thermal mass 104 may be made of metal such as aluminum or copper and may be located at an end position apart from the sensor holders.

Figure 11A:
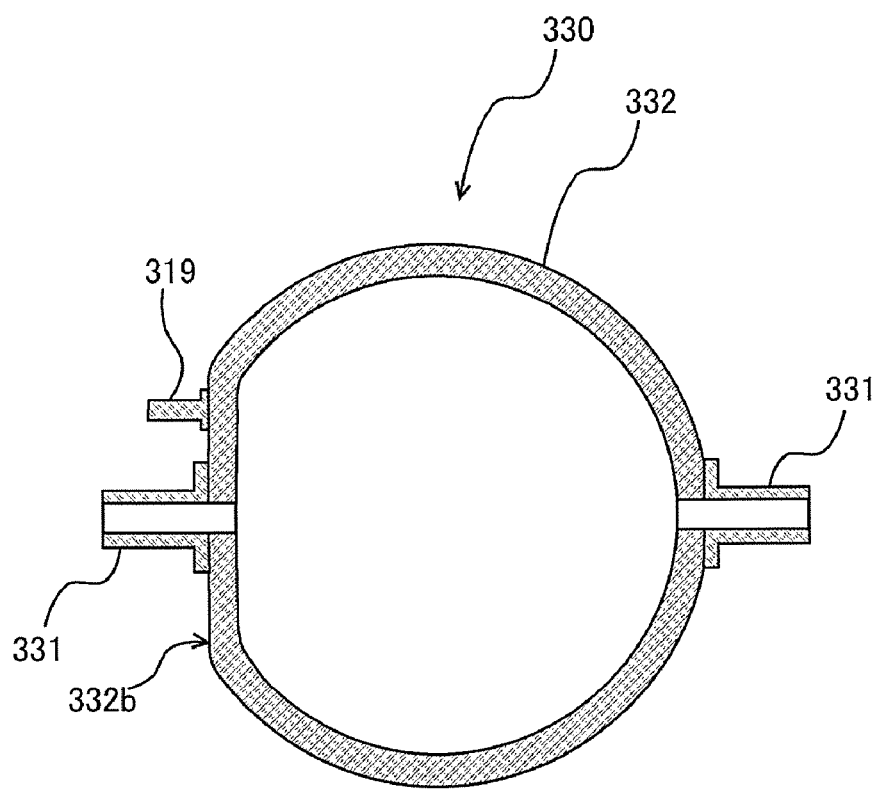
FIGS. 11A and 11B show explanatory views of an example of a mechanical stopper for stopping rotation of a sensor holder.
Figure 11B:
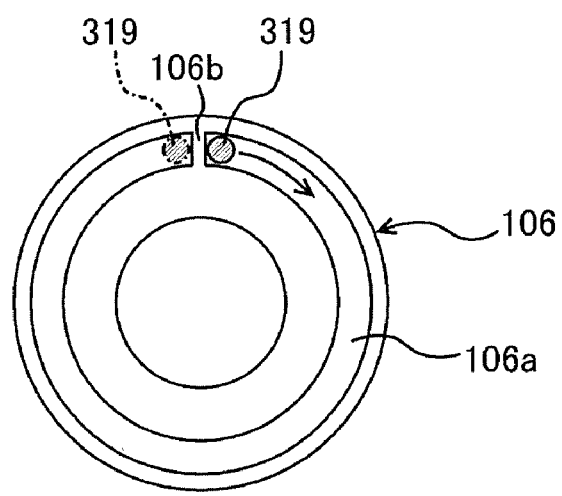

FIGS. 11A and 11B show explanatory views of an example of a mechanical stopper for stopping rotation of a sensor holder. At least one of the sensor holders may be provided with the mechanical stopper to prevent the sensor holder from rotating more than a predetermined rotation angle. For example, the mechanical stopper may be configured by using a pin member 319 fixed on flat portion 332b of the outer surface of the sensor holder body 330 and a guide member 106 having a ring-shaped guide groove 106a. The ring-shaped guide groove 106a has a partition plate portion 106b at a predetermined position for stopping the pin member 319. When rotating the sensor holder 330, the top portion of the pin member 319 moves along the ring-shaped guide groove 106a by a rotation angle of almost 360 degrees as shown by an arrow in FIG. 11B and the movement of the pin member 319 is blocked by the partition plate portion 106b. Touch sensors may be attached on the side-wall surfaces of the partition plate portion 106b for detecting the arrival timing of the pin member 319 to the blocked position. The detected result may be used for controlling an electrical supply to the motor 400.

Figure 12A:
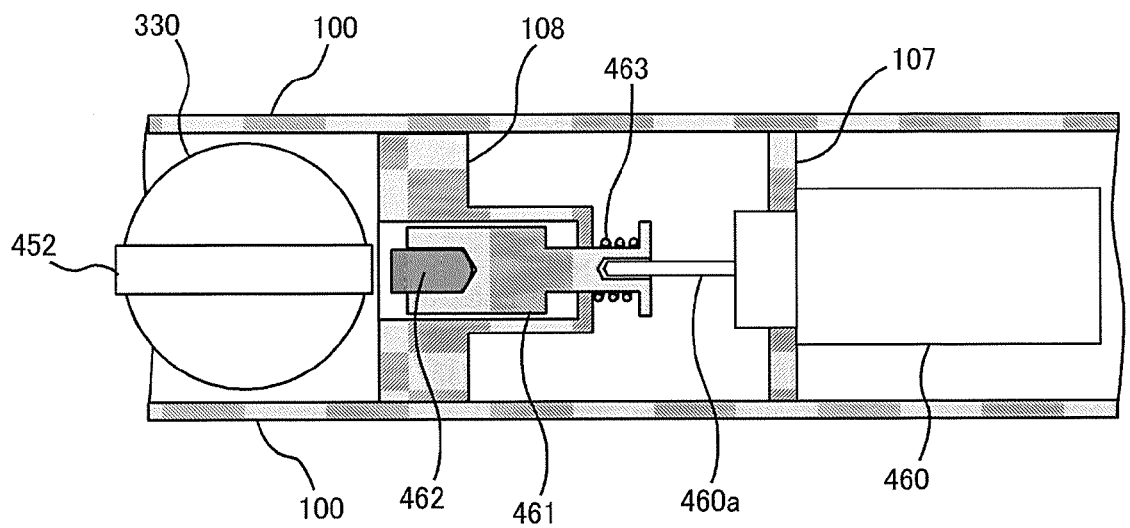
FIGS. 12A and 12B show explanatory views of an example of a clump mechanism for clumping a sensor holder.
Figure 12B:
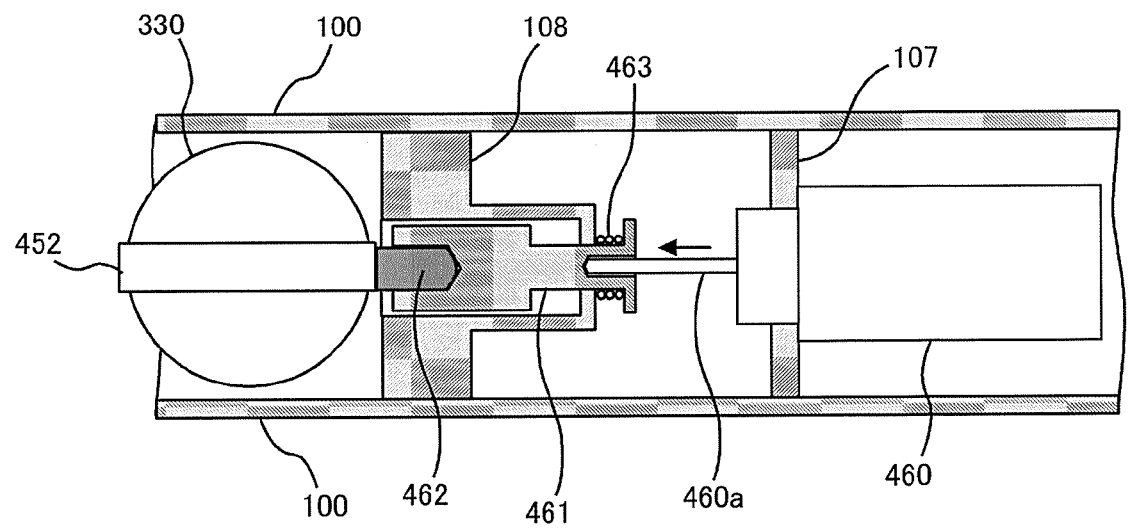

FIG. 12 shows an explanatory view of an example of a clump mechanism for clumping a sensor holder. The clump mechanism may be configured to clump at least one of the sensor holders when a power supply to the motor 400 is turned off. The third sensor holder 330 may be preferably clumped by the clump mechanism as shown in FIGS. 12A and 12B. The clump mechanism may be configured by using a solenoid 460 fixed on a support member of the housing 100, a movable member 461 with an elastic pressing part 462, a guide member 108 for guiding the movable member 461 in a central open cavity, a spring 463 for biasing the movable member 461 to set apart from the sensor holder 330. The guide member 108 is fixed to the inner surface of the housing 100. A movable shaft 460a of the solenoid 460 is inserted into a coupling hole of the movable member 461. When the solenoid 460 is turned off, the movable member 461 is biased to move at a non-clumping position by the spring 463 as shown in FIG. 12A. When the solenoid 460 is turned on, the movable shaft 460a of the solenoid 460 depresses the movable member 461 against the biasing of spring 463 and the movable member 461 is moved at a clumping position as shown in FIG. 12B. At the clumping position, the elastic pressing part 462 included in the movable member 461 depresses the outer surface of helical gear 452 attached on the sensor holder 330. Accordingly, the sensor holder 330 and other sensor holders 310, 320 mechanically coupled with the sensor holder 330 are clumped during the power supply to the motor 400 is turned off.

Figure 13:
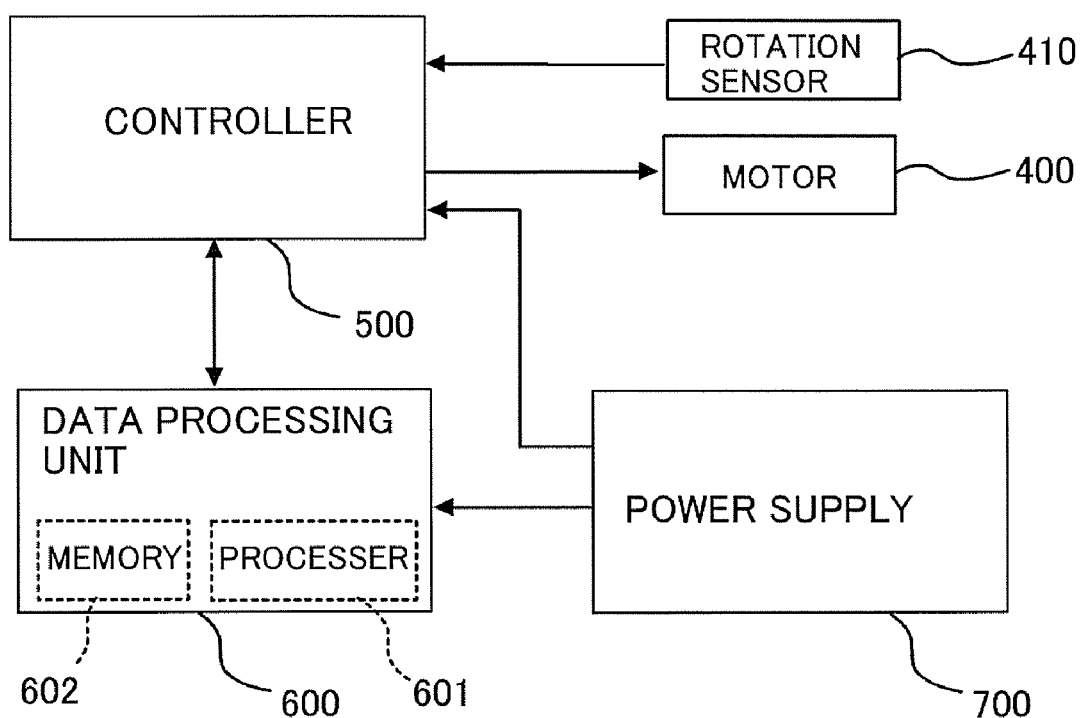
FIG. 13 shows a block diagram of electric system of the sensor apparatus.

FIG. 13 shows a block diagram of an electric system 800 of the sensor apparatus 10. The electrical system 800 includes the motor 400, the controller 500, a data processing unit 600 and a power supply unit 700. The data processing unit 600 includes a computer having a processor 601 and a memory 602. The memory 602 stores a program having instructions for the azimuth measurements.

Figure 14:
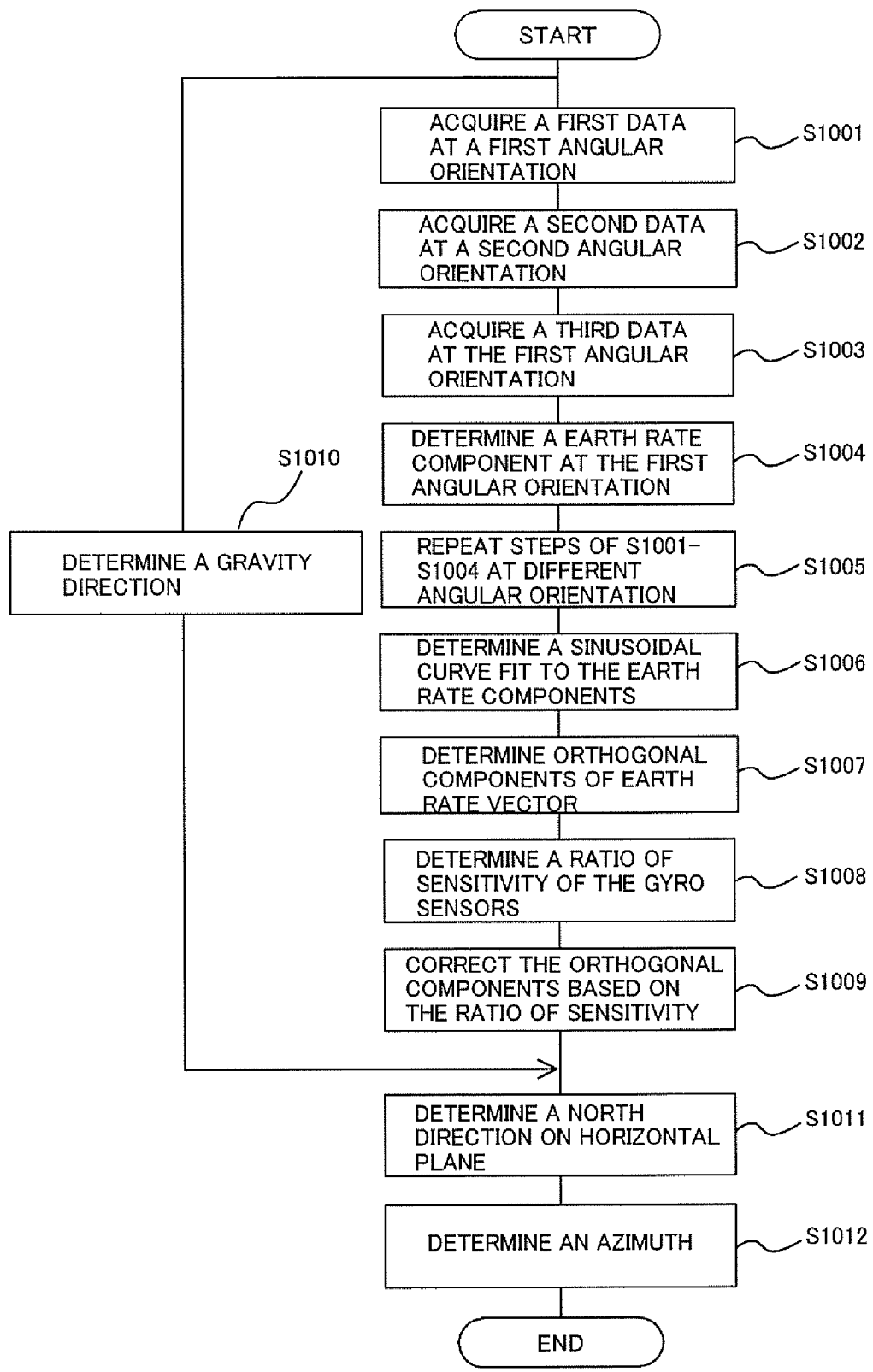
FIG. 14 shows a flow chart of an example of control of the motor and the clump mechanism.

FIG. 14 shows an example of a flow chart of data processing for azimuth measurements by using the sensor apparatus 10 with the three orthogonal axis gyro sensors. The input axes of the gyro sensors are orthogonal to each other. At least one program having instructions for the data processing is stored in the memory 602 of the data processing unit 600. The sensor apparatus 10 is stationary located at an azimuth measuring position in downhole before azimuth measurements. The data processing for azimuth measurements may be performed as described in the specification of U.S. Provisional Patent Application No. 61/053,646, which is incorporated herein by reference.

In the data processing for azimuth measurements of FIG. 14, a first data from each of the gyro sensors with an input axis aligned to a first angular orientation (0°) is acquired (S1001). After acquiring the first data, a second data from each of the gyro sensors with the input axis aligned to a second angular orientation (180°) opposite to the first angular orientation is acquired (S1002). After acquiring the second data, a third data from each of the gyro sensors with the input axis aligned to the original first angular orientation (0°) (S1003). An earth rate component at the first angular orientation is determined (S1004) by following steps of:

(i) obtaining an average $\Omega_{(0°)\_2}$ between the first data $\Omega_{(0°)\_1}$, and the third data $\Omega_{(0°)\_3}$, (ii) determining the earth rate component $\Omega_E$ by subtracting the second data $\Omega_{(180°)\_2}$ from the average $\Omega_{(0°)\_2}$ and dividing the difference by two.

The acquisition of the three data and the determination of the earth rate component for each of the gyro sensors are repeated at a plurality of discrete target angular orientations on each of the sensor rotation planes (S1005). A sinusoidal curve ($\Omega_1 = A \cos \theta_i + B \sin \theta_i$) is fit to the earth rate components at the discrete target angular orientations on each of the sensor rotation plane and the fitting parameters A and B are determined (S1006). Components of an earth rate vector with respect to a predetermined orthogonal sensor coordinates are determined based on based on a result of the sinusoidal curve fitting (S1007).

Based on a set of data from the gyro sensors with the input axes aligned to the common angular orientation (for example a angular orientation along one of orthogonal axes (x, y, z)), a ratio of sensitivity of a pair of the gyro sensors is determined (S1008). The orthogonal earth rate components corrected based on the ratio of sensitivity to eliminate scale factor error between the gyro sensors (S1009).

In parallel with data processing for the orthogonal earth rate components of an earth rate vector, a gravity direction with respect to the orthogonal sensor coordinates is determined based on acceleration data of gravity acquired with the accelerometers (S1010). A north direction is determined by projecting the earth rate vector onto a horizontal plane perpendicular to the gravity direction (S1011). Finally, an azimuth of a target direction on the horizontal plane is determined based on the north direction (S1012).

There is a trade-off between dynamic range and resolution of the gyro sensor. If we focus on only azimuth measurements, the dynamic range may be reduced. The dynamic range may be set so as to cover not only the earth rate but also bias drift due to environmental temperature change.

There are many variety types of gyro sensors 210, 220, 230 used for the azimuth measurements. Among the variety types of gyro sensors, a MEMS gyro sensor of ring oscillating type may be preferably used in terms of the accuracy, measurement robustness in environmental vibration conditions.

Figure 15:
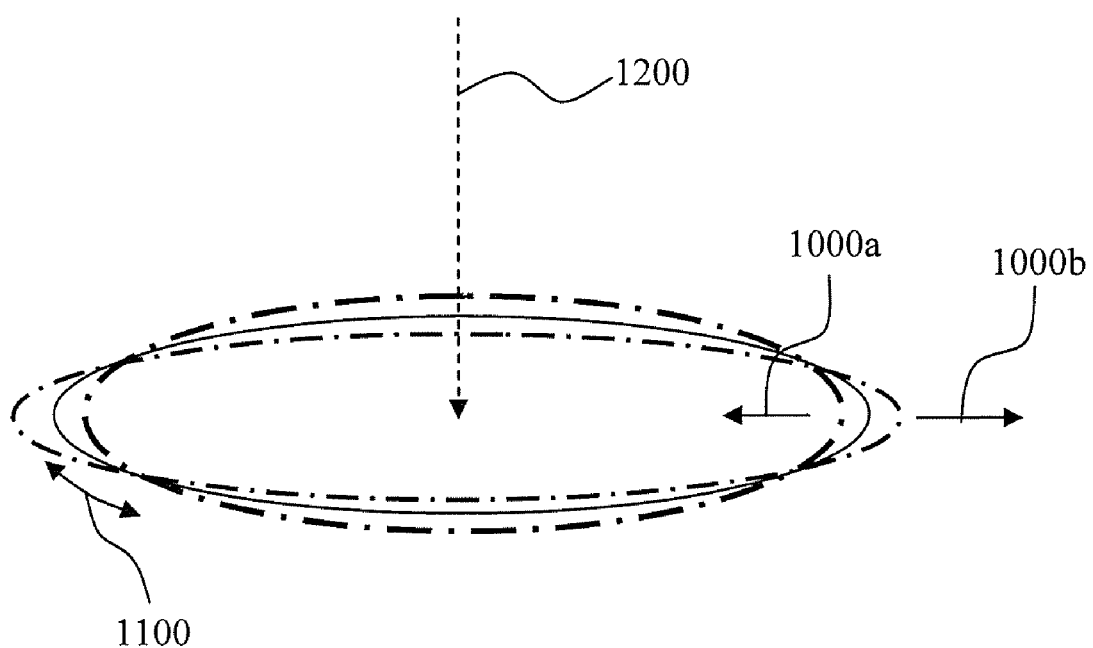
FIG. 15 shows a conceptual plane view of a ring oscillator of an electromagnetically vibrating structure gyroscope.

In order to reduce noise in wires from a sensor peripheral circuit of a sensor apparatus including at least one gyro sensor, the sensor peripheral circuit may be configured to dispose an analog circuit portion of the sensor peripheral circuit as close as to the gyro sensor and to output only digital signals to the wires. For this configuration, the analog circuit portion may be included together with the gyro sensor head on a flipped stage of the driving mechanism and flipped or rotated together with the sensor head. In one embodiment of the invention, there can be used a vibrating structure gyroscope which has a sensing element vibrated or oscillated by an electromagnetic force in a constant magnetic field. Such a sensing element can be shaped like a beam, a tuning fork, a cylinder, a hemispherical shell or a ring made from ceramic, metal or silicon. FIG. 15 shows an oscillation ring of the electromagnetically vibrating structure gyroscope. As can be seen, the ring can be vibrated or oscillated in the direction of arrows 1000a, 1000b, when an alternative current 1100 flows in the ring under a constant or static magnetic field which is applied in the direction of an arrow 1200. In order to achieve high accuracy, it is desirable to keep the magnetic field stable. However, an external or environmental magnetic field or its fluctuation may cause to disturb such a constant or static magnetic field and to make measurement errors for the gyro sensors. In one embodiment of the invention, the gyro sensors are preferably magnetically shielded from the external magnetic field in order to avoid disturbance from the external magnetic field or its fluctuation. Specifically, the above sensor holders or the housing can include magnetic shielding material. Such material generally has magnetically high permeability. Examples of the material is permalloy, PC-Permalloy, Supermalloy, Mu-metal, Sendust, and so on, PC-Permalloy contains approximately 78~80% of nickel. Preferably, after PC-Permalloy is used to produce the sensor holders or the housing, the holder or the housing can be annealed to obtain magnetic properties for desired magnetic shielding.

The drive mechanism of the sensor apparatus may be configured with separate motors. Each separate motor may drive each gyro sensor directly without a gearbox. Rotation angle sensors are provided in order to detect rotation angle positions of rotation axes of the motors, respectively. The drive mechanism with separate motors may be used to minimize angle errors due to back lash of the gear box in the sensor apparatus with relatively wide physical space for installation.

Any gyro sensor has more or less temperature sensitivity in its output. Especially downhole condition in oilfield temperature is changing. Some pre-calibration of the gyro sensor output against temperature using equation for temperature compensation with at least one coefficient may be performed before azimuth measurement in downhole. The coefficient obtained by the pre-calibration may be used to compensate the sensor output by monitoring temperature with a temperature sensor in the sensor part and/or the peripheral circuit. This kind of temperature compensation may be also performed for output data of the accelerometers. The temperature sensors can be installed on the gyro sensor and its analog circuit. The compensation is conducted to compensate temperature dependency of scale factor, bias and misalignment using pre-calibration coefficients of the temperature dependency of each item.

Each output of three-orthogonal axis gyro sensors, three-orthogonal axis accelerometers, and temperature sensors for the gyro sensors and accelerometers is input into the data processing unit. The data processing of the output data may be conducted by a digital signal processing unit (DSP) or a field programmable gate array (FPGA).

The power unit may be configured with a battery. The use of battery has an advantage in MWD and LWD applications, where no electric power is supplied through the cables of MWD and LWD tools.

The sensor apparatus may be installed in a downhole tool. When the Z-axis defined as parallel to a tool axis of the downhole tool is almost vertical, azimuth cannot be defined because of no projection of the Z-axis onto the horizontal plane. Instead of the Z-axis, the projection of other alternative axis onto the horizontal plane may be used to determine an angle from the north direction. The alternative axis may be defined so as to be normal to a reference face on side surface, which is called tool face. The direction of the tool face is determined with gyro sensors and accelerometers in the manner explained above during the tool are under a stationary condition. Once the tool starts moving in downhole, an additional gyro sensor installed in the tool monitors the tool rotation about Z-axis. The additional gyro sensor with an input axis parallel to a tool axis defined in the tool having the gyro sensors for azimuth measurements may be useful to monitor the tool rotation. Dynamic range of the added gyro sensor is large enough to cover the maximum angular rate of the tool rotation. Angular rate output of the additional gyro sensor is integrated to calculate rotation angles of the tool.

Figure 16:
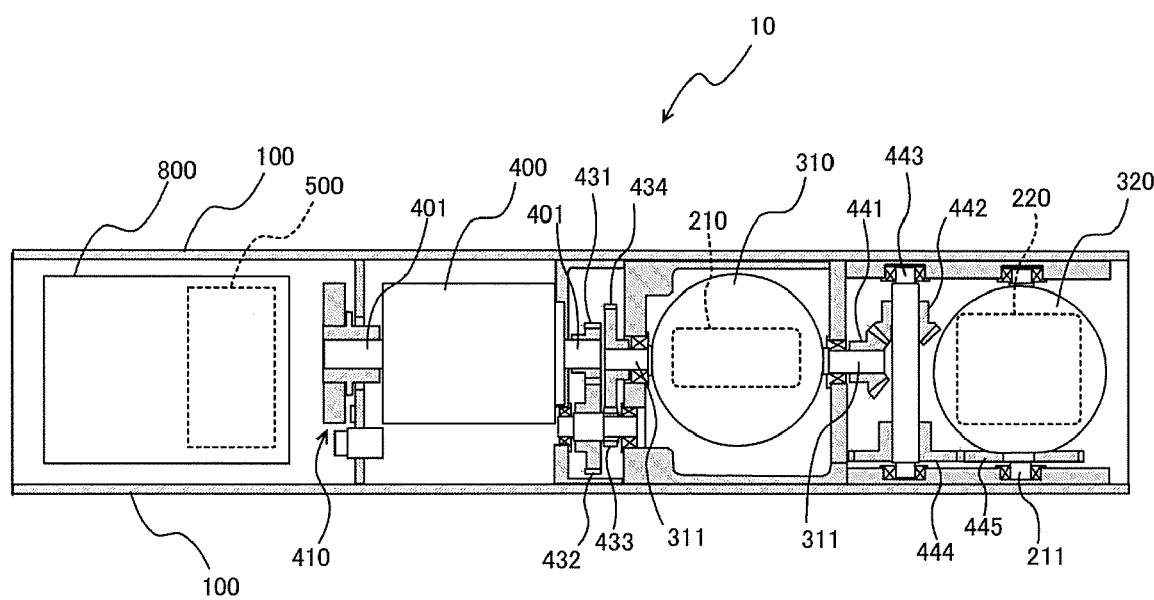
FIG. 16 shows a partial cross-sectional plan view of a sensor apparatus for azimuth measurements in another embodiment according to the present invention.

In a limited inclination range, it is possible to use only two orthogonal axis gyro sensors for azimuth measurements. In this case, the sensor apparatus 10 includes only two sets of sensor holders and orthogonal axis gyro sensors as shown in FIG. 16.

While the techniques have been described with respect to a limited number of embodiments, those skilled in the art, having benefit of this disclosure, will be appreciate that other embodiments can be devised which do not depart from the scope of the techniques as disclosed herein. For example, the techniques are applicable to mechanical gyro sensors and optical gyro sensors (e.g. laser gyros and optical fiber gyros) or any other gyro sensors.

What is claimed is:

1. An apparatus for azimuth measurements, comprising:
    a housing;
    a plurality of gyro sensors aligned in the housing, each of the plurality of gyro sensors having an input axis for angular velocity measurements; and
    a drive unit for rotating each of the plurality of gyro sensors about a rotation axis,
    wherein each of the plurality of gyro sensors changes orientation of the input axis with the drive unit.

2. The apparatus according to claim 1, wherein the plurality of gyro sensors comprises a rotation axis orthogonal to each other.

3. The apparatus according to claim 1, wherein the drive unit comprises a motor, a transmission mechanism connected between the motor and the plurality of gyro sensors, and a controller for the motor.

4. The apparatus according to claim 2, wherein the drive unit is configured to change the orientation of the input axis thereof independently.

5. The apparatus according to claim 1, further comprising:
    a data processing unit for processing output data from the gyro sensors; and
    electrical interconnections between the plurality of gyro sensors and the data processing unit.

6. The apparatus according to claim 5, wherein the electrical interconnections comprise wires or flexible printed circuits wound around rotation axes of the plurality of gyro sensors by a predetermined winding number.

7. The apparatus according to claim 5, the electrical interconnections comprise wires or flexible printed circuits passed through hollow rotation axes of the plurality of gyro sensors.

8. The apparatus according to claim 5, wherein the electrical interconnections comprise slipping electrodes on the rotation axes and contact electrodes for contacting on the slipping electrodes.

9. The apparatus according to claim 5, the electrical interconnections are made by wireless communication with radio wave or light.

10. The apparatus according to claim 1, wherein each of the plurality of gyro sensors comprises a MEMS type gyro sensor.

11. The apparatus according to claim 10, wherein the MEMS gyro sensor comprises a ring oscillating type gyro sensor.

12. The apparatus according to claim 1, each of the plurality of gyro sensors comprises a vibrating structure oscillated by an electromagnetic force in a first magnetic field.

13. The apparatus according to claim 12, the vibrating structure is shielded from an external second magnetic field.

* * * * *